(12) United States Patent
Lev (10) Patent No.: US 9,184,471 B2
(45) Date of Patent: Nov. 10, 2015

(54) LIGHT-WEIGHT BIPOLAR VALVE REGULATED LEAD ACID BATTERIES AND METHODS THEREFOR

(75) Inventor: Frank Lev, Thornhill (CA)

(73) Assignee: East Penn Manufacturing Co., Lyon Station, PA (US)

( * ) Notice: Subject to any disclaimer, the term of this patent is extended or adjusted under 35 U.S.C. 154(b) by 0 days.

(21) Appl. No.: 13/580,449

(22) PCT Filed: Mar. 4, 2011

(86) PCT No.: PCT/US2011/027139
§ 371 (c)(1),
(2), (4) Date: Nov. 12, 2012

(87) PCT Pub. No.: WO2011/109683
PCT Pub. Date: Sep. 9, 2011

(65) Prior Publication Data
US 2013/0130096 A1    May 23, 2013

Related U.S. Application Data (60) Provisional application No. 61/310,847, filed on Mar. 5, 2010.

(51) Int. Cl.
*H01M 10/18* (2006.01)
*H01M 4/16* (2006.01)
(Continued)

(52) U.S. Cl.
CPC ............. *H01M 10/18* (2013.01); *B23K 26/20* (2013.01); *H01M 2/0277* (2013.01); *H01M 4/16* (2013.01);
(Continued)

(58) Field of Classification Search
None
See application file for complete search history.

(56) References Cited

U.S. PATENT DOCUMENTS

| 2,966,538 A | 12/1960 | Bernot |
| 3,775,189 A | 11/1973 | Jaggard |

(Continued)

FOREIGN PATENT DOCUMENTS

| CN | 1123473 A | 5/1996 |
| CN | 101192684 A | 6/2008 |

(Continued)

OTHER PUBLICATIONS

State Intellectual Property Office Notification of First Office Action and English translation, Application No. 201180022616.3, dated Aug. 5, 2014, 18 pages.

(Continued)

*Primary Examiner* — Patrick Ryan
*Assistant Examiner* — Haixia Zhang
(74) *Attorney, Agent, or Firm* — Barley Snyder (57) ABSTRACT

Light-weight VRLA batteries comprise a thin lead substrate that is supported by non-conductive, preferably plastic frames that provide structural stability to accommodate stress and strain in the bipole assembly. In particularly preferred batteries, the plastic frames are laser welded together and phantom grids and electrode materials are coupled to the respective sides of the lead substrate. Where the phantom grid is an ultra-thin lead grid, the lead grid is preferably configured to provide a corrosion reserve of less than 10 charge-discharge cycles and the bipole assembly is charged in an in-tank formation process. Where the phantom grid is a non-conductive grid, the lead grid is preferably a plastic grid and the bipole assembly is charged in an in-container formation process. Consequently, weight, volume, and production costs are significantly reduced while specific energy is substantially increased.

9 Claims, 5 Drawing Sheets

(51) Int. Cl.
  *H01M 4/68* (2006.01)
  *H01M 4/73* (2006.01)
  *B23K 26/20* (2014.01)
  *H01M 2/02* (2006.01)
  *H01M 10/12* (2006.01)
  *H01M 10/14* (2006.01)
  *H01M 10/42* (2006.01)

(52) U.S. Cl.
  CPC  *H01M 4/68* (2013.01); *H01M 4/73* (2013.01); *H01M 10/121* (2013.01); *H01M 10/14* (2013.01); *H01M 2010/4292* (2013.01); *Y02E 60/126* (2013.01); *Y10T 29/49114* (2015.01); *Y10T 29/49115* (2015.01)

(56) References Cited

U.S. PATENT DOCUMENTS

| | | | |
|---|---|---|---|
| 3,806,696 | A | 4/1974 | Young et al. |
| 3,819,412 | A | 6/1974 | Taylor et al. |
| 5,068,160 | A | 11/1991 | Clough et al. |
| 5,225,061 | A | 7/1993 | Westerlund |
| 5,234,779 | A * | 8/1993 | Mix et al. ............... 429/186 |
| 5,326,656 | A | 7/1994 | Meadows et al. |
| 5,429,643 | A | 7/1995 | Lund et al. |
| 5,432,028 | A * | 7/1995 | Barlow ................... 429/134 |
| 5,508,131 | A | 4/1996 | Bowen et al. |
| 5,512,065 | A | 4/1996 | Kump et al. |
| 5,593,797 | A | 1/1997 | Brecht |
| 5,993,494 | A * | 11/1999 | Malikayil .............. 29/623.5 |
| 6,017,653 | A | 1/2000 | Petrakovich et al. |
| 6,620,551 | B1 | 9/2003 | Shiomi et al. |
| 6,649,306 | B2 | 11/2003 | Prengaman |
| 8,524,389 | B2 | 9/2013 | Ett et al. |
| 8,568,940 | B2 | 10/2013 | Newman et al. |
| 2003/0072988 | A1 * | 4/2003 | Frisch et al. ............. 429/36 |
| 2008/0090146 | A1 * | 4/2008 | Batson .................... 429/200 |
| 2008/0105540 | A1 | 5/2008 | Federico et al. |
| 2008/0124625 | A1 | 5/2008 | Hock et al. |
| 2008/0131775 | A1 * | 6/2008 | Takayama et al. ....... 429/210 |

FOREIGN PATENT DOCUMENTS

| | | |
|---|---|---|
| CN | 201336335 Y | 10/2009 |
| JP | 0210661 A | 1/1990 |
| WO | 00/63987 | 10/2000 |
| WO | 2006/114605 | 11/2006 |
| WO | 2010/019291 | 2/2010 |
| WO | 2010/135313 | 11/2010 |

OTHER PUBLICATIONS

First Office Action, Application No. 201180022616.3, dated Aug. 5, 2014, 11 pages.
Japanese Office Action and English translation, Application No. 2012/556255, dated Mar. 4, 2015, 8 pages.
Abstract of CN1123473, dated May 29, 1996, 1 page.
Abstract of JPH0210661, dated Jan. 16, 1990, 2 pages.
English translation of the State Intellectual Property Office of P.R.C. Search Report, Chinese Application No. 201190022616.3, dated Apr. 3, 2015, 2 pages.
The State Intellectual Property Office of P.R.C. Search Report, Chinese Application No. 201190022616.3, dated Apr. 3, 2015, 11 pages.
English Translation of the Notification of Second Office Action, Chinese Application No. 201190022616.3, dated Apr. 3, 2015, 2 pages.
English Translation of Text of Second Office Action, Chinese Application No. 201190022616.3, dated Apr. 3, 2015, 13 pages.

* cited by examiner

LIGHT-WEIGHT BIPOLAR VALVE REGULATED LEAD ACID BATTERIES AND METHODS THEREFOR

This application claims priority to our U.S. provisional patent application with the Ser. No. 61/310,847, filed Mar. 5, 2010.

FIELD OF THE INVENTION

The field of the invention is lead acid batteries and their manufacture, and especially as it relates to valve regulated lead acid (VRLA) batteries.

BACKGROUND OF THE INVENTION

Increased demands on battery performance and economics of battery manufacture as well as recent advances in battery technology have provided new momentum to the development and production of bipolar lead acid batteries. However, despite various improved compositions and methods, various fundamental problems in the manufacture of substrates and current collectors remained. Moreover, despite various advances in bipolar battery design, relatively lame quantities of metallic lead are still required to retain structural stability during manufacture and repeated charge/discharge cycles.

For example, it is known in the art to weld together pure lead grids and pure lead plates to form a composite collector structure with relatively low internal impedance and at least somewhat increased oxidation and corrosion resistance as described in U.S. Pat. No. 3,806,696. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

However, where such batteries are subject to deep cycling, a $PbSO_4/PbO_x$ layer is formed that will act as an insulator and so leads to premature capacity loss of the battery. Alternatively, various lead alloys (e.g., lead-calcium alloy) can be used together with a pure lead substrate as shown in U.S. Pat. No. 6,620,551 to so avoid formation of the insulating layer. Unfortunately, as the conductive grid is in most cases laminated to the lead substrate, delamination will ultimately reduce the lifetime of such batteries. Moreover, and regardless of the type of lead grid material, significant weight is added to the battery by virtue of having a conductive grid.

Similarly, where the substrate is a lead plate or a lead-coated plate, electrolyte creep from one cell to is often unavoidable and will internally short circuit the battery. In the same manner, difficulties with assembly of bipole elements into a bipolar battery stack remain. For example, it is known to stack and seal cells using certain sealants or sealing devices. While such approach tends to increase complexity in manufacture, it still often provides undesirable results, especially where the battery is run over numerous cycles. To overcome at least some of the problems associated with known sealants or sealing devices, bipoles may be pressed together to improve sealing of the gap. However, over-compression will negatively affect battery performance.

Therefore, even though numerous devices and methods of lead acid bipolar batteries are known in the art, all or almost all of them suffer from various disadvantages. Thus, there is still a need to provide improved lead acid bipolar batteries and production processes.

SUMMARY OF THE INVENTION

The inventive subject matter is directed to various methods and devices for lead acid bipolar batteries, and especially VRLA batteries with significantly reduced weight, increased specific energy, and substantially simplified manufacture. In particular preferred aspects, the overall quantity of metallic lead in the construction of a bipole is reduced by reduction and in some cases even complete elimination of the positive side current collector while electrolyte creep is avoided by providing an enhanced adhesive at the substrate-frame border, and by successively laser welding frames into a bipole stack.

In one aspect of the inventive subject matter, a bipolar electrode assembly includes a first non-conductive frame that defines a first window, wherein the first frame is welded or glued to a second non-conductive frame that defines a second window. A lead foil is then coupled to the first and second frames such that opposite first and second sides of the lead foil are accessible through the first and second windows, respectively. In especially preferred aspects, the first and/or second non-conductive frames further comprise an enhanced adhesive (preferably disposed in a channel) that includes a viscosity modifier (e.g., fumed silica powder) and/or a coupling agent (e.g., silane) such that the enhanced adhesive is positioned between the lead foil and the first and/or second non-conductive frames. In contemplated assemblies, a first phantom grid is coupled to a positive electrode material, wherein the first grid and the positive electrode material are positioned in the first window and are conductively coupled to the first side of the lead foil. Likewise, a. second phantom grid is coupled to a negative electrode material, wherein the second grid and the negative electrode material are positioned in the second window and are conductively coupled to the second side of the lead foil.

Most preferably, first and second non-conductive frames are laser welded together and/or the lead foil is a lead tin alloy having a thickness of less than 0.2 mm. To further reduce weight of the assembly, it is generally preferred that one or both of the phantom grids are manufactured from a non-conductive material or from lead or a lead alloy (in this case, the phantom grid will typically provide a corrosion reserve of less than 10, and even more typically less than 5 charge-discharge cycles). It should further be appreciated that the positive electrode material can be (dried and cured) positive active material, the negative electrode material can be (dried and cured) negative active material, or that the positive and negative electrode materials are lead oxide paste.

Where multiple assemblies are stacked together and coupled to a negative and positive end pole assembly, a bipolar battery assembly is formed, which can then be encased using suitable housing components, or even encapsulated in a (typically thermoplastic) polymer.

In another aspect of the inventive subject matter, a lead acid battery bipole for use in a valve regulated lead acid battery will comprise a phantom grid that is coupled to positive active material, negative active material, or lead oxide paste, wherein the weight ratio of positive active material to phantom grid is equal or less than 0.50, more typically equal or less than 0.40, and most typically equal or less than 0.25. Where desired, the positive active material or the negative active material may be washed and dried active material.

In yet another aspect of he inventive subject matter, a valve regulated lead acid battery will have a metallic lead and/or lead alloy content of equal or less than 10 g/Ah in fully discharged condition and a specific energy content of at least 45 Wh/kg, and more preferably a metallic lead and/or lead alloy content of equal or less than 6.0 g/Ah, or a specific energy content of at least 54 Wh/kg.

Consequently, a method of manufacture of a bipolar electrode assembly is contemplated that includes a step of positioning a lead foil having opposite first and second sides between a first non-conductive frame defining a first window and a second non-conductive frame defining a second window. In another step, an enhanced adhesive is positioned between the lead foil and at least one of the first and second non-conductive frames, wherein the enhanced adhesive comprises at least one of a viscosity modifier (e.g., fumed silica powder) and a coupling agent (e.g., a slime), and in yet another step, the first frame is laser-welded to the second frame such that the first and second sides of the lead foil are accessible through the first and second windows, respectively. In still another step, a first phantom grid is coupled to a positive electrode material, and the first grid and the positive electrode material are positioned in the first window to conductively couple the positive electrode material to the first side of the lead foil, and in a further step, a second phantom grid is coupled to a negative electrode material, and the second grid and the negative electrode material are positioned in the second window to conductively couple the negative electrode material to the second side of the lead foil.

Most preferably, the first and/or second phantom grids are non-conductive, and positive and negative active materials are formed from the positive and negative electrode materials in an in-container formation process. Alternatively, the first and/or second phantom grids are conductive, and positive and negative active materials are formed from the positive and negative electrode materials in an in-tank formation process.

Various objects, features, aspects and advantages of the inventive subject matter will become more apparent from the following detailed description of preferred embodiments, along with the accompanying drawing figures in which like numerals represent like components.

DETAILED DESCRIPTION

The inventor has discovered that bipolar batteries, and especially VRLAs with high power densities can be produced in a simple and cost-effective process that will significantly reduce use of metallic weight and substantially eliminates electrolyte creep and/or loss. In especially preferred aspects, the substrate of a bipolar electrode assembly is made from a very thin lead (alloy) foil, while the grid/current collectors are replaced by a phantom grid (e.g., a grid made from a non-conductive polymeric material, or a ultra-thin lead grid that preferably has a thickness just sufficient to allow in-container formation without providing corrosion reserve for use during charge/discharge cycles). Thus, use of metallic lead is substantially reduced, typically up to 65% as compared to known VRLA bipolar electrode assemblies.

Moreover, electrolyte creep and/or loss is preferably avoided by laser welding of the frames to provide a tight and durable seal between the frame elements. Additionally, the inventor has discovered that the interface between the lead substrate and the frames can be reliably sealed using an enhanced adhesive composition that has been modified by additives to increase viscosity and adhesion to the substrate. The so sealed frame has proven to provide creep-free operation over the lifetime of a VRLA battery.

Furthermore, it should be particularly noted that contemplated devices and methods will typically not require retooling or dedicated equipment, but can be produced/practiced using most if not all of the currently existing production equipment and processes. Therefore, VRLA batteries with remarkably improved performance and reliability can be made in a simple and economic manner.

Figure 1A:
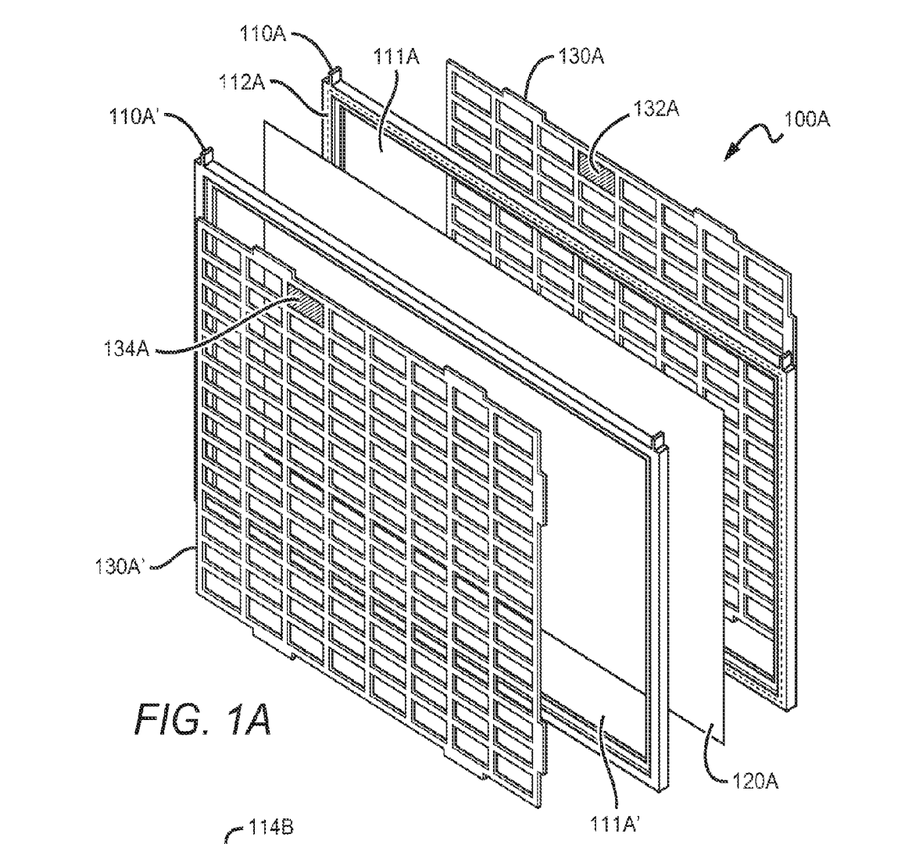
FIG. 1A is an exploded view of an exemplary bipolar electrode assembly according to the inventive subject matter.

One exemplary bipolar electrode assembly is depicted in FIG. 1A where assembly 100A comprises first and second polymeric frames 110A and 110A', respectively, which also define respective windows 111A and 111A'. It is further preferred that each frame comprises a small channel (or otherwise recessed structure, not shown) to at least partially accommodate enhanced adhesive 112A, which will then sealingly contact lead foil 120A, preferably on either side of the foil. The frames are then fitted together and are typically laser welded to form a unitary structure. It is still further preferred that the frames are configured such that the windows will accommodate respective phantom grids 130A and 130A', which may or may not be pre-filled with positive and negative electrode materials 132A and 134A (for ease of illustration, only one grid field is shown filled in FIG. 1A). As will be discussed further below, the positive and negative electrode materials 132A and 134A may have already been subjected to a curing, drying, formation, and/or post-formation drying step, or may be lead oxide/sulfuric acid paste.

Figure 1B:
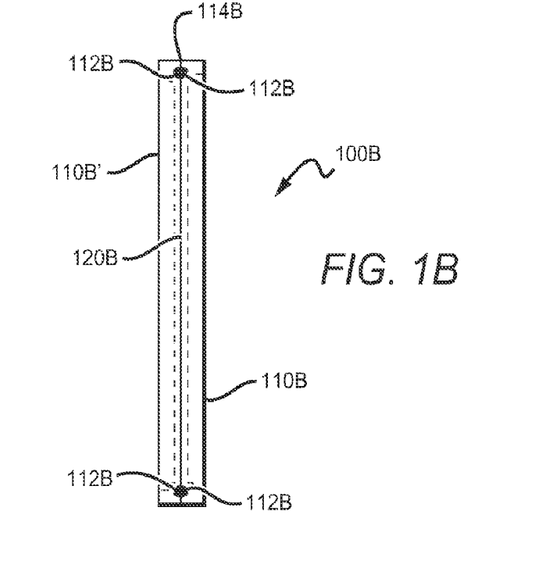
FIG. 1B is a side view of the assembled and welded bipolar electrode assembly of FIG. 1A.

FIG. 1B depicts an exemplary assembled bipolar electrode assembly 100B in which the two transparent polymer frames 110B and 110B' are laser welded together. Laser weld 114B is typically continuous and formed such as to produce a complete seal between the two frames. Also disposed and retained between the two frames is lead alloy foil 120B. Here, it should be particularly noted that most, if not all heretofore know devices were vulnerable to electrolyte creep. In the present example, creep is entirely avoided by use of an enhanced adhesive 112B that circumferentially seals the lead foil to the frame. In contrast to other devices, the enhanced adhesive is modified with a viscosity modifier to increase viscosity and/or coupling agent to enhance adhesion between the lead foil and the frame, Such enhanced adhesives have proven to be impervious to electrolyte migration over extremely long periods and typically outlasted the design life of the battery. As can also be seen from FIG. 1B, the frames have appropriately sized cutouts to accommodate the phantom grids in such a manner that the grid and/or electrode materials conductively contact the lead (alloy) foil and such as to accommodate at least part of the separator. In such devices, it should be readily apparent that multiple bipolar assemblies can be welded together to so form a bipolar electrode stack for production of a bipolar battery. The frames will have one or more further openings (not shown) to allow venting and/or electrolyte filling.

Figure 2:
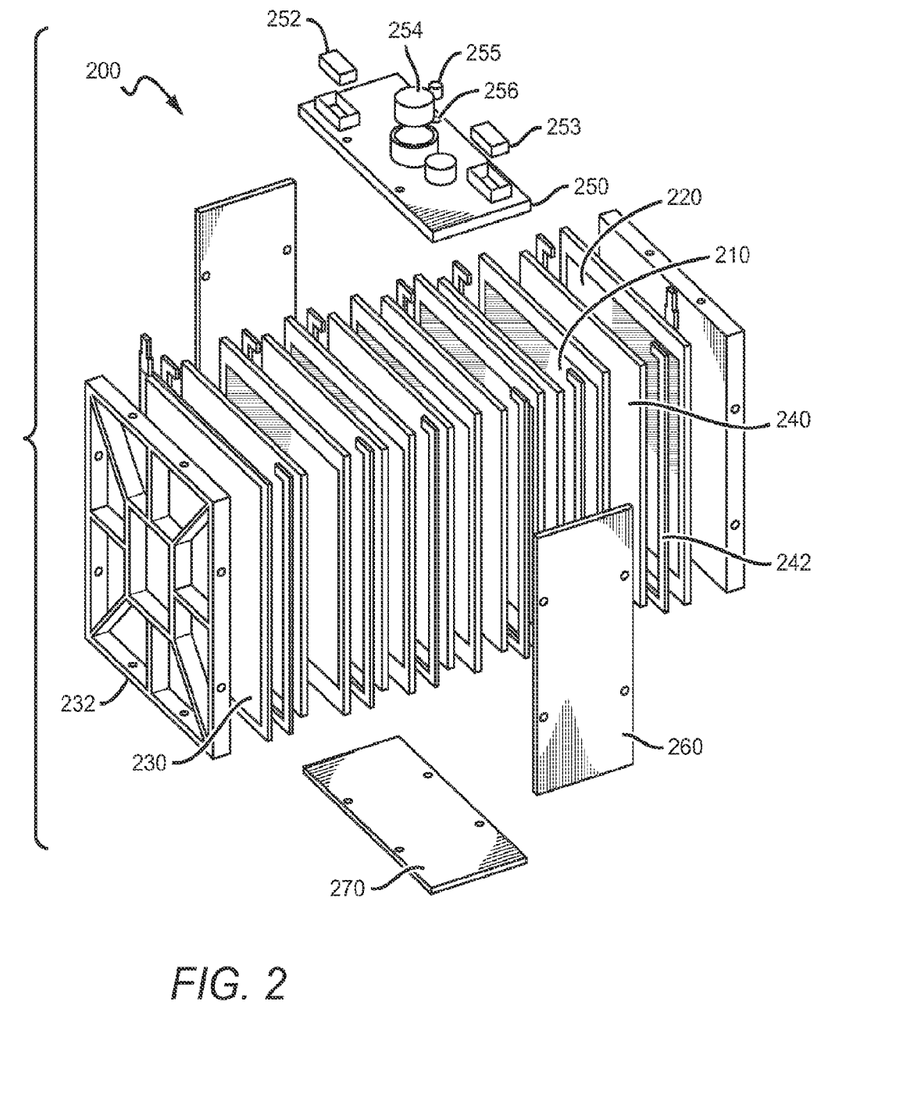
FIG. 2 is an exploded view of an exemplary VRLA.

FIG. 2 schematically illustrates an exemplary VRLA battery using bipolar electrode assemblies as shown in FIGS. 1A and 1B. Here, battery 200 includes a plurality of bipolar electrode assemblies 210 and positive and negative end plates 220 and 230, respectively. The bipolar electrode assemblies 210 are sandwiched between separators 240 to complete a cell with the adjacent assembly/endplate (electrolyte is filled into the space that includes the separators). In most cases, separator spacers 242 will be included, however, they may also be integrated into the frames. Coupled to the end plates are plates 232, and the battery housing is completed by addition of side plates 260, bottom plate 270, and top plate 250. The top plate further includes a valve 254, filling port 256 and cap 255, as well as terminal seals 252 and 253.

Consequently, it should be appreciated that particularly preferred bipolar electrode assemblies will comprise first and second Bon-conductive frames defining respective first and second windows, wherein the frames are preferably laser welded together. Disposed between the frames is an electrode substrate (most typically pure lead [e.g., at least 99.9 wt %] or lead alloy (e.g., lead tin alloy) such that opposite sides of the substrate are accessible through the first and second windows. To avoid any difficulties associated with electrolyte leakage, it is generally preferred to have an enhanced adhesive placed between the substrate and frames. A first phantom grid, typically already coupled to a positive electrode material, is then placed in the first window to allow conductive contact with the first side of the substrate, second phantom grid, also typically already coupled to a negative electrode material, is placed in the second window to allow conductive contact with the second side of the substrate. Thus, it should be recognized that a durable bipolar electrode assembly can be manufactured in a highly simplified manner that is impervious to undesirable electrolyte migration, even over several hundred charge/discharge cycles at severe working conditions (e.g., at least 80% depth of discharge). Moreover, and as described in more detail below, the weight of the bipolar assemblies is significantly reduced due to use of a very thin substrate, and the replacement of conductive structural lead grids with phantom grids. Viewed from another perspective, it should be appreciated that a lead alloy grid, of substantially reduced corrosion reserve and weight is produced that is strong enough to endure stress and strain exerted by high volume production equipment during pasting, flash drying and stacking of electrodes. Thus, already existing production processes and equipment can be used in conjunction with the teachings presented herein.

Figure 3:
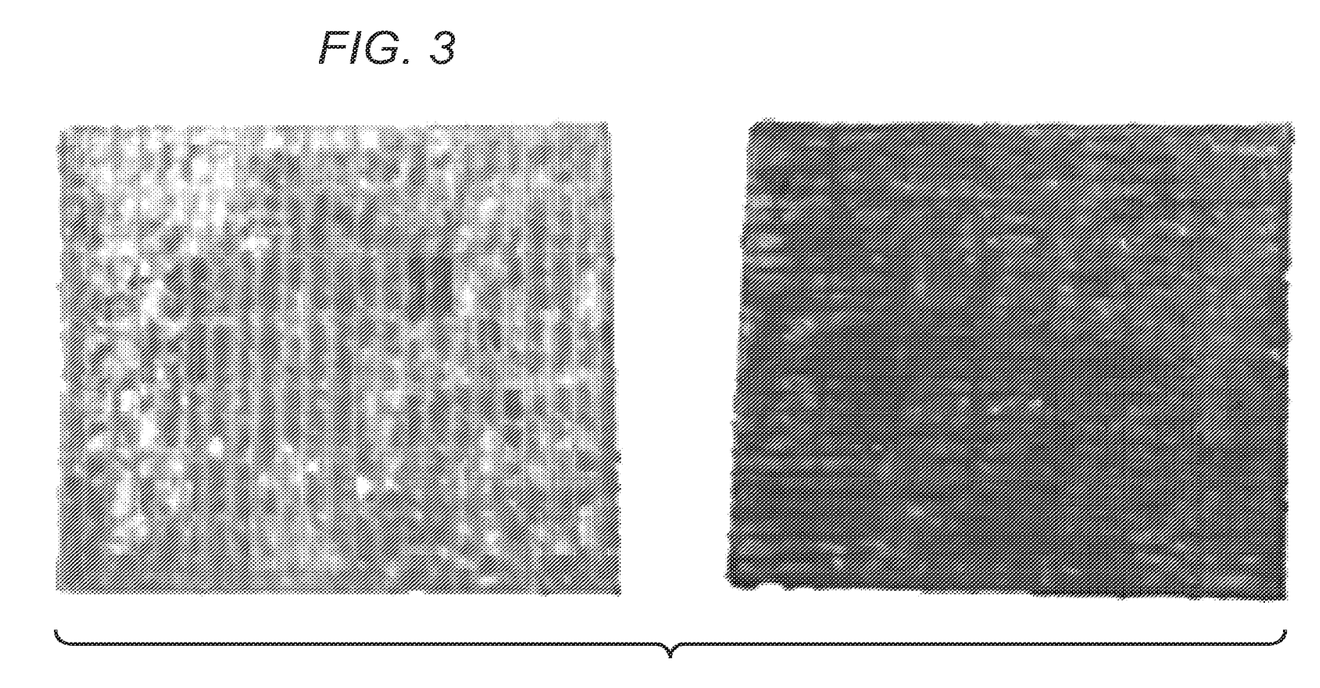
FIG. 3 is a photograph of PAM and NAM slabs according to one aspect of the inventive subject matter.

The term "phantom grid" as used herein refers to a grid that is either non-conductive or a grid that is conductive, but fails to provide corrosion reserve beyond ten, more typically five, and most typically three charge/discharge cycles. Thus, where the phantom grid is conductive, it is generally preferred that the grid is made from lead or a lead alloy that has a thickness sufficient to allow a single in-tank or in-container formation, but that will not provide conductive function beyond a low number (typically 1-10) of charge/discharge cycles. Alternatively, a phantom grid may be configured as conductive or non-conductive filler that is randomly disposed in the electrode materials. The term "electrode materials" as used herein refers to a lead-based material that is in contact with the phantom grid, and thus includes lead paste (i.e., material prior to formation) and active materials (i.e., material after formation). Exemplary active electrode materials will glass fiber filler obtained from in-tank formation are depicted in the photograph of FIG. 3. Here, as detailed further below, the left panel shows the metallic positive active material (PAM) while the right panel shows the brownish negative active material (NAM).

For VRLA bipolar batteries, it is further generally preferred the weight ratio of electrode material to phantom grid is relatively low. For example, preferred ratios of phantom grid to electrode material (e.g., PAM, NAM, lead oxide paste) is equal or less than 0.50, more typically equal or less than 0.40, and most typically equal or less than 0.25. It is further contemplated that such grids may include washed and dried PAM or NAM. In contrast, conventional VRLA batteries have a ratio of lead grid weight to positive active material weight equal to approximately 0.68. Consequently, batteries with significant improved specific energy can be produced. For example, using contemplated devices and methods, valve regulated lead acid batteries having a metallic lead and/or metallic lead alloy content of equal or less than 10 g/Ah, more typically equal or less than 8 g/AH and most typically equal or less than 6 g/Ah (in fully discharged condition) and a specific energy content of at least 45 Wh/kg, more typically at least 50 Wh/kg, and most typically at least 54 Wh/kg can be produced. For example, such advantages translate to reduced production costs, reduced use of up to 60% metallic lead (and in some cases even higher), reduced volume (typically at least 10% smaller volume) and weight (typically 25% lower overall weight) than conventional general purpose VRLA batteries. Among other types of batteries, especially preferred VRLA batteries include general purpose batteries, SLI (starting, lighting, ignition) batteries, UPS (uninterruptible power supply) batteries, and batteries for transportation (hybrid or electric car batteries, etc.). Independent tests of 25 preproduction prototypes of bipolar VRLA 5 Ah-12V batteries have confirmed the soundness of the sealed bipoles, as evidenced by their performance over 22.0 cycles at C/3 to 100% DOD to 80% of initial capacity.

With respect to suitable frame materials it should be appreciated that various materials are deemed suitable, and especially preferred materials include light-weight materials that may or may not be conductive. For example, preferred light-weight materials include various polymeric materials, carbon composite materials, light-weight ceramics, etc. However, particularly preferred materials include those suitable for thermoplastic laser welding. For example, contemplated thermoplastic material include acrylonitrile-butadiene-styrene (ABS), various polyacrylates (PA), polycarbonates (PC), and polypropylenes (PP), poly(methyl methacrylate) (PMMA), polystyrene (PS), and polybutylene terephtalate (PBT), which may be reinforced with various materials, and especially with glass fibers. Indeed, the material choice in this instance is only limited by the plastic to be laser penetrable at least at some point in the welding/assembly process. Furthermore, it is noted that where the polymer is completely transparent, pigments (internal or external) may be used to absorb the laser energy to thereby facilitate welding.

Consequently, the manner of fusion of the frames will vary depending on the material choice and includes spot and seam welding, ultrasonic welding, chemical welding using activated surfaces (e.g., plasma etched surfaces), and use of one or more adhesives. However, in most preferred embodiments, laser welding is employed in a semi- or fully automated manner for frame coupling as well as frame assembly. In such methods, a laser beam penetrates an upper optically transparent thermoplastic frame or other component and is converted into heat by either a bottom absorbent thermoplastic or by a laser absorbent dye at the weld interface. It is farther generally preferred that an external force is applied during the welding process to force together both thermoplastic parts, allowing for the conduction of heat from the laser-absorbent thermoplastic to the laser-penetrable thermoplastic, thus partially melting both components and creating a bond. Thermal expansion in the welding zone creates internal pressure and leads to a strong weld between the parts.

Figure 4:
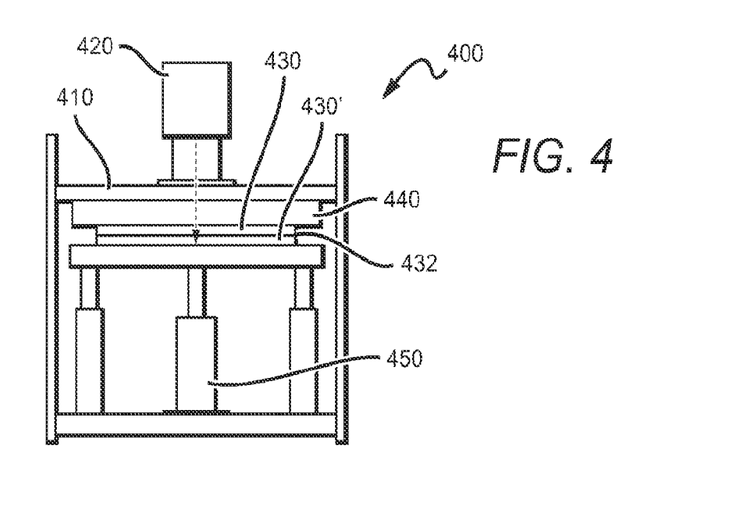
FIG. 4 is an exemplary schematic illustration for laser welding device according to one aspect of the inventive subject matter.

It should be especially appreciated that laser transmission welding offers significant advantages in welding plastics over conventional welding technologies, including lack of contact with the welding tool, flexible joining technique, minimal thermal stress on the welded parts, simple joining seam geometry, lack of particulate development, vibration-free processing, optically perfect welding seam, high precision, high strength, gas-tight, hermetic seals, and lack of consumables (e.g., adhesive, fasteners, etc.). Thus, difficulties associated with vibration or ultrasonic welding (see e.g., U.S. Pat. No. 5,512,065, or 5,068,160) as currently encountered can be entirely avoided. An exemplary laser welding device is shown in FIG. 4. Here, device 400 includes a typically transparent base 410 and a CNC two-axis controlled laser head 420. At least one of the thermoplastic frames (or assemblies) 430 and 430" have a thermoplastic dye 432, and the frames or other components are pressed against holding glass plate 440 by hydraulic or pneumatic fixture 450, which exerts appropriate pressure for laser welding. For example, a suitable welding device is commercially available (Leister Technologies www.leisterlaser.com) and includes a fixture that is used to secure welded components in desired relationship to each other. An appropriately powered laser is supported and moved by a robotic arm or other programmable system (e.g., CNC arm) to direct the laser beam along the desired welding pattern.

Of course, it should be noted that additional adhesives and/or sealants may be used to produce an electrolyte impervious assembly. For example, a bead of adhesive may be applied to the flange of a current collector. The welding seam of about 0.8 to 1.0 mm width is encompassing the flange of the current collector and will so encapsulate the current collector in thermoplastic (unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary). In at least some of the embodiments, the appearance of the assembly is reminiscent of a plastic-laminated picture. Of course, the exact positioning of the adhesive will be dictated by the particular configuration of the frames and substrate. Thus, adhesives may be provided in a channel or other recess in at least one of the frames, or applied liberally to the facing portions of the frames that are not subject to laser welding.

While numerous adhesives are deemed suitable for use herein, especially suitable polymer adhesives include two-component epoxies, and particularly those customarily used by lead acid battery OEMs to seal battery posts. In an attempt to reduce the mobility of the epoxy formulations on the planar surfaces, the inventor discovered that when the viscosity was somewhat increased, superior operating characteristics could be achieved. Among other suitable compounds to increase viscosity, especially preferred compounds included $SiO_2$ fumed silica powder (e.g., commercially available from Cabot Corporation under trade name Cabosil M5™). By adding such silica powder at about 2% to 8% by weight, and more typically 4% to 5% by weight to the epoxy components (e.g., Atlas type A epoxy, commercially available from SNS Mould Chemical S. Korea), the inventor produced a sealer compound that proved to be impervious to electrolyte and electrolytic shunts through 390 cycles at C/2 to 80% DOD to 70% of initial capacity. Binding and sealing capacity between the substrate and phantom frame could even more improved by adding a coupling agent to the adhesive. Among other agents, the inventor discovered that silane performed exceptionally well (e.g., Silane from API Advanced Polymer Inc. NJ, USA) and preferred quantities of the coupling agents were between 0.1 and 5 wt %, and most preferably between 1 and 3 wt %.

With respect to the substrate it should be recognized that all known bipolar lead acid battery substrates are deemed suitable for use in conjunction with the teachings presented herein. In one preferred aspect of the inventive subject matter, the substrate is a pure lead (i.e., at least 99 wt %, more typically at least 9.9 wt %) foil or lead alloy (e.g., lead tin, lead bismuth, lead calcium, etc.) foil having a thickness of equal or less than 5 mm, more typically equal or less than 2 mm, and most typically equal or less than 0.5 mm (e.g., 0.2 mm, or 0.1 mm). Alternatively, lead coated conductive or non-conductive substrates may be employed. In this case, it is especially preferred that the substrate is a quasi-bipole as described in WO2010/019291. Most preferably, the non-conductive portion of such bipole substrate is a laser weldable plastic and the welding process can be used to produce an impervious seal. Alternatively, suitable substrates also include monolithic substrate in which a grid is electroformed on or welded to a lead foil as described in WO2010/135313.

As already noted above, laser welding can then be further used to join the entire stack of bipoles together using a sequential operation, starting with a negative end-plate. A positive bipole is then placed on the top of the end-plate within the guide rails of the device. An air cylinder or other pneumatic, hydraulic, or mechanic device then actuates the holding fixture upward towards a stationary glass head to press the components against each other, after which a laser beam traces a programmed pattern to weld the entire perimeter of the plastic flanges to each other. Thus, one bipole at a time, the stack is progessively assembled in the welding apparatus. For example, experimental bipolar batteries were welded together from seven bipolar battery components to produce a 12V battery assembly as is schematically illustrated in FIG. 2. The assembly can be finished by applying a cover-jacket component to strengthen the battery assembly and to relieve the hoop stresses arising from the internal recombinant gas pressure. Once more, laser welding is especially advantageous for this process step (cover-jacket bonding to the bi-poles and the end plates) as a conventional hot platen method is generally not suitable for welding of planar components. The assembly is finished after bonding the lid component in place on the top of the stack. The lid can be bonded by a hot platen or by an adhesive, as it is typically practiced by lead acid battery manufacturers. However, it is once more advantageous to use laser welding as this process is much faster and less prone to quality related issues, compared to the other two known methods.

Alternatively, it should be appreciated that the assembled components (particularly after laser welding) can also be encapsulated in a thermoplastic material using suitable molds well known in the art. It should be noted that thermoplastic encapsulation was originally developed by DuPont for potting of electrical coils and electric motor components and is particularly suitable for high volume production. Although widely used in the aforementioned applications, encapsulation is virtually unknown in lead acid battery manufacturing. The object of encapsulation is to produce a uniform layer of thermoplastic over the bipole frames and end plates of the BLAB, thus connecting and sealing these components to each other. A fully automated process of BLAB assembly could therefore employ a step of stacking pre-assembled bipoles with separators into a suitable mold. Once the components are in place, the mold is closed and thermoplastic injection cycle is initiated. Then, the mold is opened to eject the finished battery. The encapsulation method is significantly faster than conventional housing manufacture, and in some cases even faster than laser welding, thus further reducing the quantity of components required for final assembly. Such method is especially suitable for smaller size batteries.

The so assembled battery is then tilled with electrolyte and thereafter undergoes a process of formation. Thus, in one aspect of the inventive subject matter, formation can be performed "in-container", which is customarily done for relatively small VRLA batteries. Here the fully assembled batteries are subjected to formation while the bipoles are installed in the housing. Larger batteries are commonly subjected to "in-tank" formation, where the grid and active materials are subjected to formation in an electrolyzer. However, it should be appreciated that the batteries presented herein are suitable for both processes.

The inventor unexpectedly discovered that contrary to common belief that only pasted, cured, and formatted plates are capable of a good interface between the grid and positive active material (PAM), a charged positive active material placed on the lead foil substrate is also capable of a good interface in a matter of several charge/discharge cycles. Notably, a charged negative plate presents more problems as it will rapidly discharge in the open air. To avoid damage to the charged negative active materials the inventor have developed a method of assembly under a protective atmosphere (e.g., nitrogen gas), which entirely eliminated the air oxidation problem. Alternatively, the inventor also contemplates covering the negative active materials with an oxygen impervious material that disintegrates/dissolves upon charging and/or contact with electrolyte.

Furthermore, recognizing the advantage of using dry charged plates, the inventor also developed a method of production and in-tank formation for dry charged plates. The dry charged plates are then easily integrated into the battery assembly processes. To produce tank formatted electrodes suitable for bipolar cells, the inventor used in the phantom grid a conductive and significantly lighter grid than conventional plates. It should be especially noted that the light grids turned out to be quite acceptable, since in the bipolar battery the grid is not mechanically stressed by the weight of the electrode material and is not required to have wires adequately thick for high electric currents and grid corrosion. Indeed, the inventor noted that the phantom grid must only adequately retain its active material and pass just enough of the electrical current to meet the formation requirements. Testing prototypes have confirmed the viability of these light grids. Light grids will typically have a wire strength that is at least 10%, more typically at least 25%, and most typically at least 33% less than that of a conventional grid and an overall weight that is least 10%, more typically at least 25%, and most typically at least 33% less than that of a conventional grid. Viewed from another perspective, it should be recognized that while conventional VRLA battery have a ratio of lead grid weight to positive active material weight of about 0.68 (+/−5-10%), the lead alloy phantom grid with reduced corrosion reserve has substantially lower weight, and suitable weight ratios can be as low as between 0.60 and 0.45, more preferably between 0.45 and 0.30, and most preferably between 0.30 and. 0.20.

It should be especially appreciated that the method of production of dry charged bipolar battery electrodes is highly advantageous as it enables integration of the manufacture of bipolar battery plates into existing production processes for conventional batteries. The bipolar battery produced according to the inventive subject matter presented herein will use up to 52% less metallic lead than its conventional counterpart. Moreover, it should be noted that Pb-Ca alloy may be used for one or both of the both positive and negative phantom grids, which provides an additional economic advantage.

In yet another aspect of the inventive subject matter, the inventor further discovered that dry charged battery plates (active materials) can also be produced even without a grid. More specifically, positive and negative electrode materials can be mixed with one or more structural fillers to so retain desirable characteristics. For example, electrode materials were mixed with 2% glass fibers (e.g., PA10-6 produced by HV), and optionally additional binders. Remarkably, the so formed lead pastes were no different from conventional lead pastes. However, unlike conventional electrode materials with lead pasted grids, the masses containing the structural fillers were rammed into plastic molds to form slabs of desired proportions.

Figure 5:
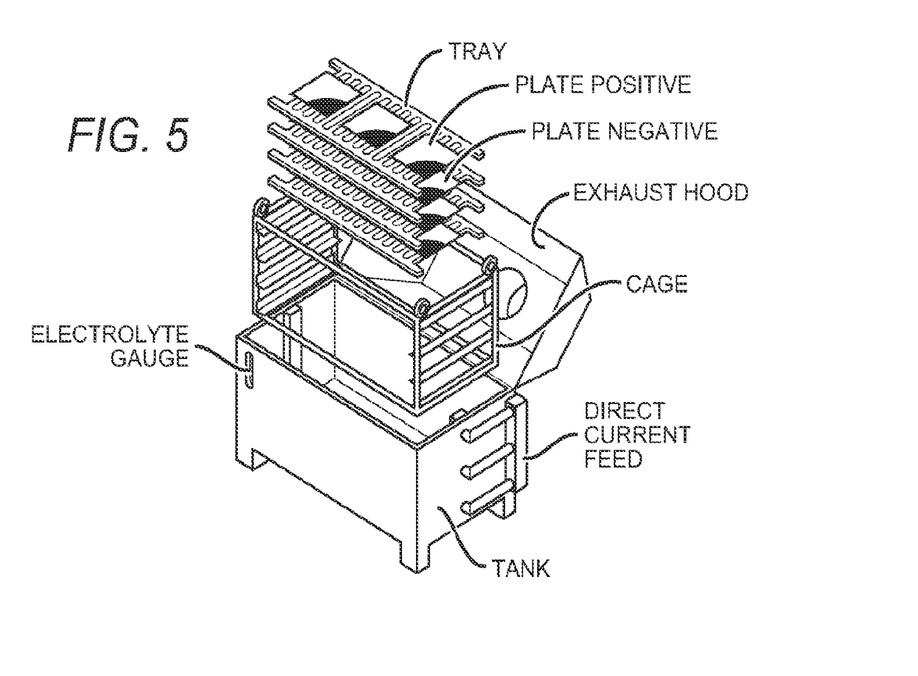
FIG. 5 is an exemplary schematic illustration of a formation tank according to another aspect of the inventive subject matter.

The curing and drying processes are then preferably carried out in the same way as with conventional materials. However, it is preferred to use a suitable backing (e.g., made of the pasting paper) to reinforce the slabs and facilitate their de-molding. The next step is "in-tank" formation in a modified tank as exemplarily depicted in FIG. 5. Here, to convey electric current to the slabs it is necessary to place them on the trays made of cast lead alloy of sufficient thickness. The formation current is then passed via the trays to the plates. To facilitate an efficient circulation of electrolyte, the trays are designed with adequate perforations. For the sake of convenience the trays are placed horizontally into the tank with the opposite polarity trays facing each other, however, other arrangements are also deemed suitable herein. After formation, the PAM and NAM slabs are washed and dried to obtain the dry charged active material components of the bipolar battery. That way, bipolar lead acid batteries with high specific energy and power requirement can be produced that are not susceptible to the detrimental effects of growth of the positive grids.

In yet another processing scheme, it is contemplated that formation may be performed in an "in-container" formation process, where the pasted and cured unformed bipolar assemblies are installed into the battery containers. The containers are then filled with diluted electrolyte and the cells are charged according to predetermined algorithms to achieve optimum or otherwise desired formation of the plates. It should be appreciated that such "in-container" formation may be particularly advantageous for VRLA batteries with relatively small capacity (e.g., between 1 Ah nod 10 Ah). To facilitate mass production of electrodes for VRLAs presented herein the phantom grids were non-conductive grids, preferably made from conventional thermoplastic material. Such grids are easily formed (e.g., plastic injection molding) and can be pasted in the same way as the conventional lead grids utilizing the same production equipment and methods as noted above. The pasted and cured plates are then installed into the bipolar batteries and formed according to conventional formation procedures. Thus, it should be recognized that any type of VRLA battery such as AGM, gel or AGM/gel can be produced using above methods of assembly presented herein, irrespective of the ways of production of the active material components.

Figure 6:
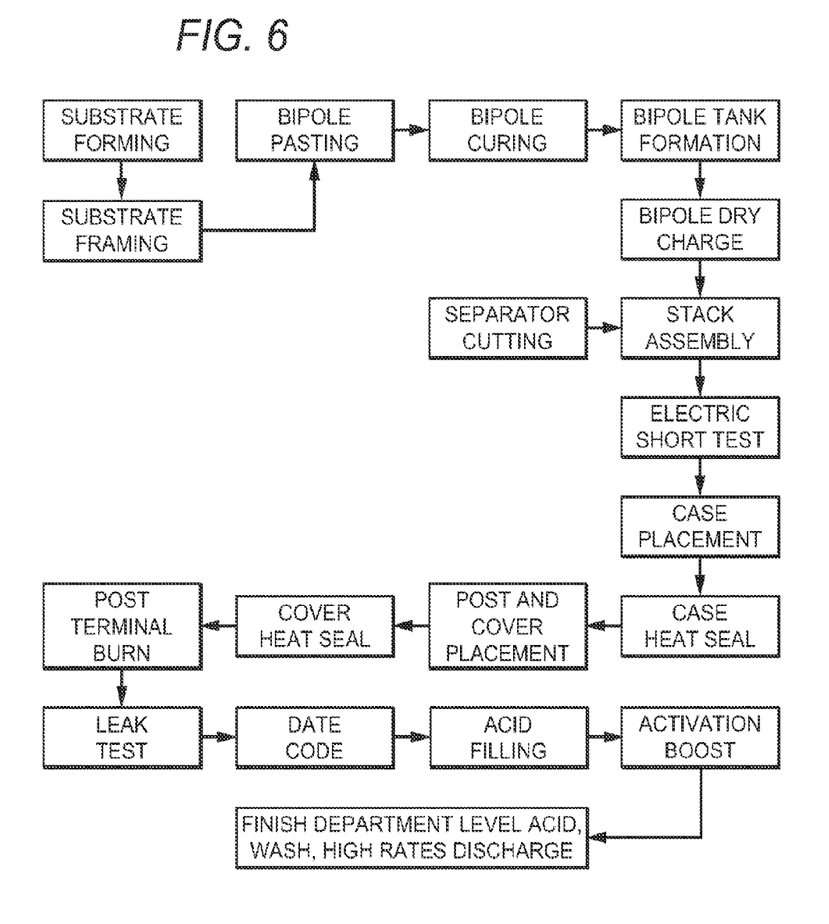
FIG. 6 is an exemplary flow chart for VRLA assembly using bipolar electrode assemblies according to the inventive subject matter.

A bipolar battery production flowchart, based on the typical production of conventional VRLA batteries, is shown in FIG. 6 that demonstrates applicability of the productions methods contemplated herein to existing methods. It will be readily apparent to the person of ordinary skill in the art that the process of the flowchart does not require complex operations (such as cast on strapping and inter-cell connection), which is typical for most production processes for conventional lead acid batteries. Thus, the bipolar batteries according to the inventive subject matter disclosed herein is less expensive to produce than a comparable conventional VRLA batteries.

Therefore, the inventor contemplates a method of manufacture of a bipolar electrode assembly in which in one step a lead foil having opposite first and second sides is positioned between a first non-conductive frame defining a first window and a second non-conductive frame defining a second window. In another step, it is preferred that an enhanced adhesive is positioned between the lead foil and at least one of the first and second non-conductive frames. Most preferably, the enhanced adhesive comprises a viscosity modifier and/or a coupling agent. The first frame is then preferably laser welded to the second frame such that the first and second sides of the lead foil are accessible through the first and second windows, respectively, and a first phantom grid is coupled to a positive electrode material and the first grid and the positive electrode material are positioned in the first window to conductively couple the positive electrode material to the first side of the lead foil. In yet another step, a second phantom grid is coupled to a negative electrode material, and the second grid and the negative electrode material are positioned in the second window to conductively couple the negative electrode material to the second side of the lead foil.

As already noted above, and depending on the particular desired formation method, at least one of the first and second phantom grids are non-conductive, and positive and negative active materials are formed from the positive and negative electrode materials in an in-container formation process. Alternatively, at least one of the first and second phantom grids are conductive, and positive and negative active materials are formed from the positive and negative electrode materials in an in-tank formation process.

It should he apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A bipolar electrode assembly, comprising:
 a first non-conductive frame defining a first window,
 wherein the first frame is coupled to a second nonconductive frame defining a second window, being connected together by a continuous laser weld to create a seal therebetween;
 a lead foil disposed between and coupled to the first and second frames such that opposite first and second sides of the lead foil are accessible through the first and second windows, respectively;
 wherein at least one of the first and second non-conductive frames further comprises an enhanced adhesive comprising a viscosity modifier and a coupling agent, wherein the enhanced adhesive is positioned between the lead foil and the at least one of the first and second non-conductive frames;
 a first phantom grid coupled to a positive electrode material, wherein the first grid and the positive electrode material are positioned in the first window and are conductively coupled to the first side of the lead foil; and
 a second phantom grid coupled to a negative electrode material, wherein the second grid and the negative electrode material are positioned in the second window and are conductively coupled to the second side of the lead foil.

2. The assembly of claim 1 wherein the viscosity modifier is a fumed silica powder, and wherein the coupling agent is a silane.

3. The assembly of claim 1 wherein the lead foil is a lead tin alloy and has a thickness of less than 0.2 mm.

4. The assembly of claim 1 wherein at least one of the first and second phantom grids are manufactured from a nonconductive material.

5. The assembly of claim 1 wherein at least one of the first and second phantom grids are manufactured from lead or a lead alloy and are configured to provide a corrosion reserve of less than 10 charge-discharge cycles.

6. The assembly of claim 1 wherein the positive electrode material is positive active material, and wherein the negative electrode material is negative active material.

7. The assembly of claim 1 wherein the positive and negative electrode materials are lead oxide paste.

8. The assembly of claim 1 conductively coupled to a negative end pole assembly, a positive end pole assembly, a separator, and at least one additional assembly according to claim 1 to thereby form a bipolar battery assembly.

9. The assembly of claim 8 wherein the bipolar battery assembly is encapsulated in a thermoplastic polymer.

* * * * *